(12) United States Patent
Bierbrauer et al.

(10) Patent No.: US 7,472,279 B2
(45) Date of Patent: Dec. 30, 2008

(54) METHOD FOR AUTOMIZED AND SYNCHRONOUS EXECUTION OF CUSTOMIZED CODE ON OFF-LOADED RETRIEVED DOCUMENTS IN A DOCUMENT PROCESSING SYSTEM

(75) Inventors: Matthias Stefan Bierbrauer, Stuttgart (DE); Daniel Haenle, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 10/015,301

(22) Filed: Dec. 12, 2001

(65) Prior Publication Data

US 2002/0078080 A1 Jun. 20, 2002

(30) Foreign Application Priority Data

Dec. 15, 2000 (EP) .................................. 00127583

(51) Int. Cl.
*H04L 9/00* (2006.01)
(52) U.S. Cl. .................... 713/179; 380/246; 707/204

(58) Field of Classification Search ................. 380/246; 713/179; 707/200–204
See application file for complete search history.

(56) References Cited

U.S. PATENT DOCUMENTS

| 6,029,178 A * | 2/2000 | Martin et al. ............... 707/201 |
| 6,199,073 B1 * | 3/2001 | Peairs et al. ............... 707/204 |
| 6,633,892 B1 * | 10/2003 | Chan et al. ................ 707/204 |
| 6,810,404 B1 * | 10/2004 | Ferguson et al. ........... 707/200 |

OTHER PUBLICATIONS

Adam Wagner et al. "NIC-Based offload of dynamic user-defined modules for Myrinet clusters"; Department of Computer Science and Engineering; The Ohio state University.*

* cited by examiner

*Primary Examiner*—Pramila Parthasarathy
(74) *Attorney, Agent, or Firm*—Martin McKinley; Winstead, P.C.

(57) ABSTRACT

A technique for executing customized code on off-loaded or retrieved documents in a document processing environment. The present invention provides a code component in the form of an agent that can be automatically executed relative to a document before a document is off-loaded, after it has been off-loaded or after it has been retrieved. Preferably, the code component is in the form of a plug-in. Embodiments of the present invention enable advantageous pre-processing and post-processing of documents in the document processing environment. Invocation of at least one agent and execution of customized code at a well-defined time, i.e., synchronous with the underlying document processing step or event.

6 Claims, 2 Drawing Sheets

US 7,472,279 B2

METHOD FOR AUTOMIZED AND SYNCHRONOUS EXECUTION OF CUSTOMIZED CODE ON OFF-LOADED RETRIEVED DOCUMENTS IN A DOCUMENT PROCESSING SYSTEM

RELATED INVENTIONS

IBM patent application Ser. No. 10/015,302, entitled "Technique for Content Off-Loading in a Document Processing System Using Stub Documents", filed concurrently herewith on Dec. 12, 2001 and IBM application Ser. No. 10/015,472, entitled "Method and System for Off-Loading and Retrieving Document Content in a Document Processing System", filed concurrently herewith on Dec. 12, 2001, are related to this invention.

BACKGROUND OF THE INVENTION

1. Field of the Invention

The invention relates to document processing environments with large document repositories. More specifically, the present invention relates to a technique for processing off-loaded and/or retrieved documents in a document processing system.

2. Description of the Related Art

A problem associated with the use of known client mailing applications, such as Lotus™ Notes™ or Microsoft™ Outlook™, is that they contain continuously growing document repositories. (Lotus and Notes are trademarks of Lotus Development Corporation and/or International Business Machines Corp., and Microsoft and Outlook are trademarks of the Microsoft Corp.) The repositories continuously grow due to the incoming and outgoing notes or emails, which will be referred to hereafter as documents, which are commonly saved until deleted by a user. Such documents often including large attachments like text documents, graphics or even storage consuming digitized pictures.

In response to this problem, a Lotus Notes application uses a Lotus Domino™ database from which a tool like IBM Content Manager CommonStore™ for Lotus Domino (CSLD) is used to move documents stored in that database to an archive physically located on a different device, such as a tape storage. CSLD thereupon permits access to the archived documents. Domino and CommonStore are trademarks of Lotus Development Corp. and/or International Business Machines Corp.

CSLD also allows to access documents that have been archived from any archive client application (e.g., scanning applications, CommonStore for SAP™, etc.). When documents are retrieved from the archive to a Notes database, a Lotus Notes document is created. SAP is a trademark of SAP AG.

Lotus Notes supports writing of customized code which, for instance, can be used to trigger workflow based on the state of off-loaded documents.

The drawback of the existing approach is that customized code can not be invoked synchronous to an archiving/off-loading and retrieval process.

SUMMARY OF THE INVENTION

Therefore, an object of the present invention is to provide a technique for enabling invocation of customized code synchronous to off-loading of content from a document in a document processing system to an archive.

Another object of the present invention is to provide a technique for enabling invocation of customized code synchronous to retrieval of content to a document in a document processing system from an archive.

Another object of the present invention is to provide a technique for synchronous code invocation in a document archiving environment which is transparent to an end user without requiring any user interaction.

The underlying idea is to provide a code component, in particular a plug-in, that is automatically started before a document is off-loaded, after it has been off-loaded or after it has been retrieved from the repository or archive.

The invention enables advantageous pre-processing and/or post-processing of documents in the above described document processing environment. This is accomplished by invocation of at least one agent and execution of customized code at a well-defined time, i.e., synchronous with the underlying document processing step or event.

In one embodiment of the present invention, a method for processing documents being off-loaded in a document processing system in which requests are executed by an off-loading process comprises the step of providing customized code for execution during the off-loading process. The method further comprises invoking the customized code when an off-loading request is issued relative to a document in the document processing system synchronously to the off-loading process. Further, the method comprises marking the document as archived when an agent is finished, where the customized code forms the agent.

BRIEF DESCRIPTION OF THE DRAWINGS

In the description that follows, the present invention is described in more detail by way of embodiments from which further features and advantages of the invention become evident, wherein.

DESCRIPTION OF THE PREFERRED EMBODIMENT

Figure 1:
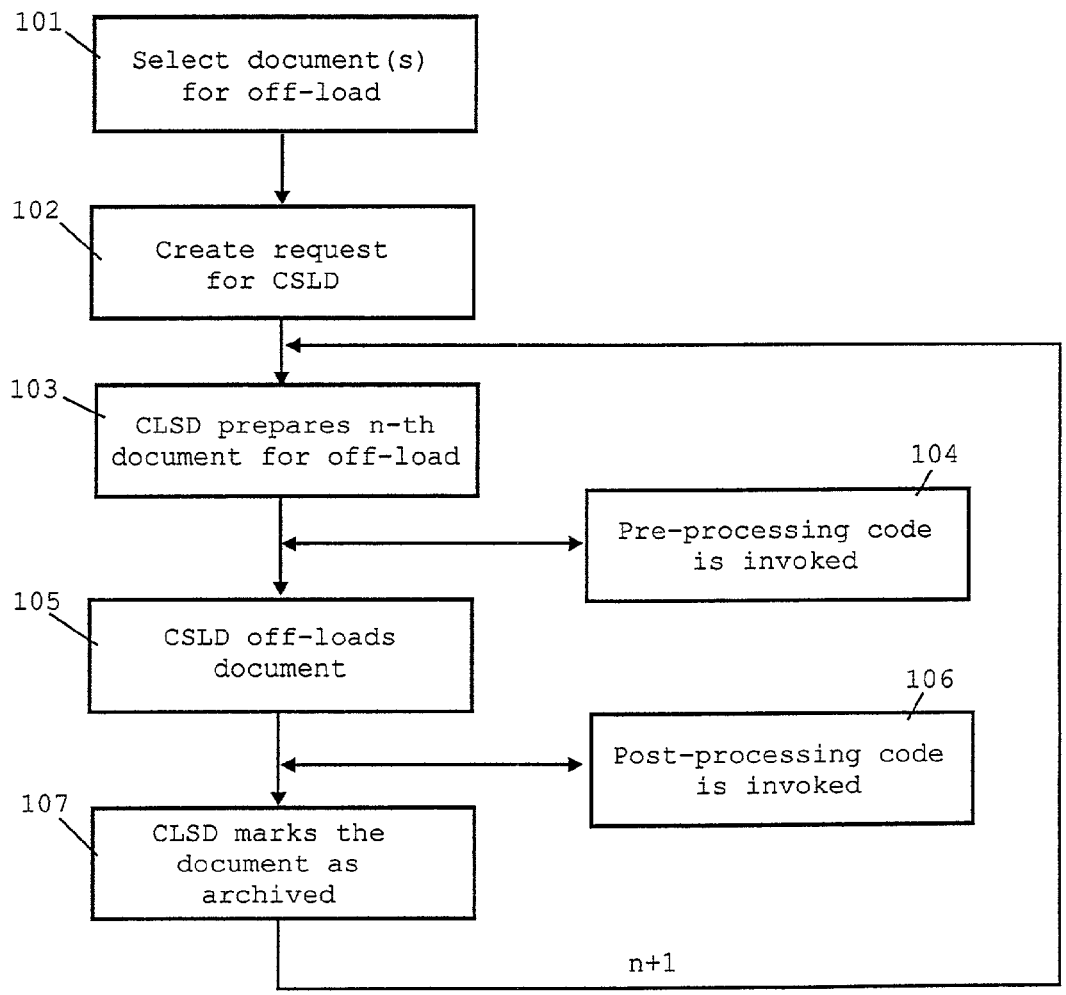
FIG. 1 shows the various steps during archiving of a number of documents, invoking pre- and post-archiving agents in accordance with the invention.

Referring now to the flowchart of FIG. 1, a user of a document processing system, such as Lotus Notes, selects one or more documents for archiving (Step 101). Based on the archiving selection step, an archiving request is created (Step 102). In the present example, the request is made to IBM Content Manager CommonStore™ for Lotus Domino (CSLD). CSLD is a tool to move Lotus Notes documents in various formats to an archive.

CSLD then prepares one of the selected documents for archiving (Step 103). In accordance with the present invention, CSLD may invoke a pre-processing agent which executes code relative to the document currently being prepared for archiving (Step 104). When the agent is finished, CSLD archives the document (Step 105). Then, alternatively or in combination with Step 104, in accordance with the present invention, CSLD may invoke a post-processing agent on the current document (Step 106). When the agent is finished, CSLD marks the document as 'archived' (Step 107), and processing returns to Step 103 for processing the next selected document to be archived. Processing ends when all the selected documents have been processed.

Figure 2:
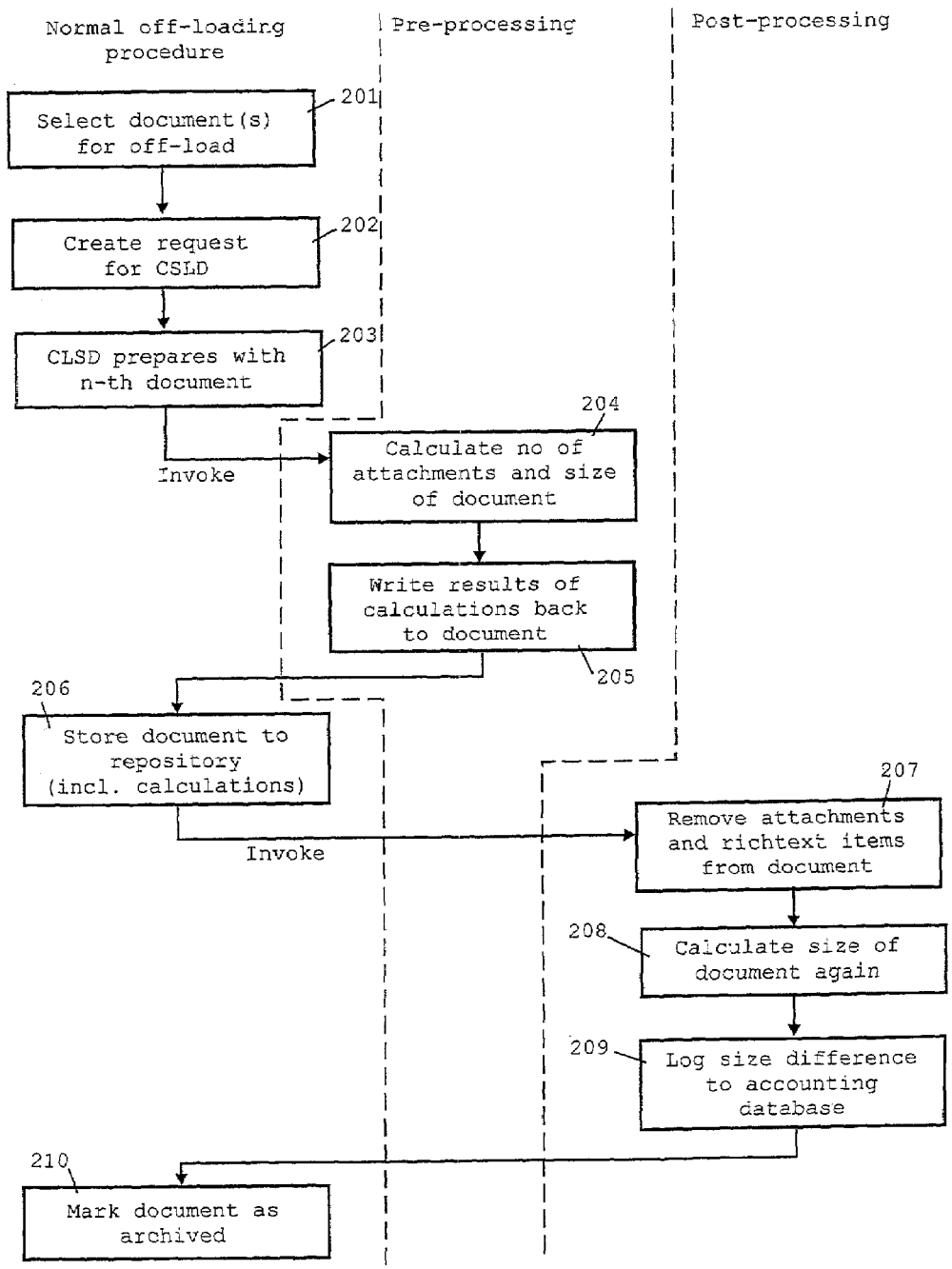
FIG. 2 shows an example of how pre-archiving and post-archiving agents can be applied to a document in a document processing system.

FIG. 2 illustrates how the pre-archiving and post-archiving agents can be used to compute the amount of archived data and write it to a database for accounting purposes. Organizations often charge individuals or departments in the organization based on the amount of storage utilized, and the present invention can be used in this situation.

It is noted that the dotted lines in the diagram separate the main path of execution from the pre-processing and post-processing paths.

In Step 201, a user selects documents for archiving. An archiving request is then created in response to the selection step (Step 202). In the present example, this request is for the CSLD. CSLD then prepares the first document for archiving (Step 203) and invokes the pre-archiving agent on it. In Step 204, the code in this agent computes the current size of the document and the number of attachments in the document. These values are written to special fields in the current document (Step 205).

When the pre-archiving agent has finished, CSLD archives the document (Step 206) and invokes the post-archiving agent. The code in this agent removes attachments and rich text items from the current document (Step 207). The size of the modified document is then calculated (Step 208). The post-archiving agent then determines the size difference between the original document and the modified document, and logs the size difference in an accounting database (Step 209). Finally, when the post-archiving agent is finished, CSLD marks the document as 'archived' (Step 210). The processing is then repeated for the other selected documents.

A similar procedure can be implemented using post-retrieval agents. In such a scenario, when the detached portions of a document are reinserted thereto, such as when a user attempts to open an archived document, the amount of retrieved data is determined and written to an accounting database.

In CSLD, pre-processing and post-processing plug-ins are realized as the following agent invocation exits:

Pre-archiving agent: A Notes agent that is invoked on a document right before it is archived. This agent is usually used to prepare a document for archiving.

Post-archiving agent: A Notes agent that is invoked on a document after it has been archived successfully. This agent can be used to delete the document, move it to a certain folder, create a stub document to release resources, collect accounting information, trigger workflows, etc.

Post-retrieval agent: A Notes agent that is invoked on a document after it has been retrieved from an archive. This agent can be used to set security properties, set workflow flags, write the document to a folder, etc.

All automatic agents are configured based on the Notes document form, i.e., for documents of different forms, different agents can be configured. The agents are invoked synchronously. The current document being archived/retrieved is passed to the agent via the session's document context. This permits the agent to be coded in LotusScript or Java. Errors occuring during agent execution are written to the CSLD trace file.

The invention claimed is:

1. A method for processing documents being off-loaded in a document processing system in which requests are executed by an off-loading process, said method comprising the steps of:
   providing customized code for execution during the off-loading process;
   invoking the customized code when an off-loading request is issued relative to a document in the document processing system synchronously to the off-loading process; and
   marking the document as archived when an agent is finished, wherein the customized code forms the agent.

2. The method according to claim 1, wherein the customized code is invoked synchronously to process the document before the document has been off-loaded from the document processing system.

3. The method according to claim 1, wherein the customized code is invoked synchronously to process the document after the document has been off-loaded from the document processing system.

4. The method according to claim 1, the agent being invoked via a plug-in interface to the document processing system.

5. The method according to claim 1, wherein the customized code runs inside a plug-in architecture.

6. A method for executing an agent comprising customized code relative to documents being archived from a document processing system, said method comprising the steps of:
   electing a document resident in the document processing system for archiving;
   creating an archiving request for the selected document to an archiving engine associated with the document processing system;
   invoking a pre-archiving agent on the selected document;
   when the pre-archiving agent is finished, archiving the selected document;
   invoking a post-archiving agent on the archived document; and
   when the post-archiving agent is finished, marking the archived document as 'archived'.

* * * * *